(12) United States Patent
Thewes et al.

(10) Patent No.: US 8,183,906 B2
(45) Date of Patent: May 22, 2012

(54) ARRANGEMENT, USE OF AN ARRANGEMENT, REFERENCE VOLTAGE SOURCE AND METHOD FOR GENERATING A VOLTAGE VALUE LINEARLY PROPORTIONAL TO THE TEMPERATURE

(75) Inventors: Roland Thewes, Gröbenzell (DE); Ralf Brederlow, Poing (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 12/403,837

(22) Filed: Mar. 13, 2009

(65) Prior Publication Data
US 2009/0322404 A1    Dec. 31, 2009

(30) Foreign Application Priority Data
Mar. 26, 2008 (DE) .......................... 10 2008 015 696

(51) Int. Cl.
*G06G 7/24*    (2006.01)

(52) U.S. Cl. ............................ 327/350; 327/362; 327/51
(58) Field of Classification Search .......... 327/350–352, 327/50, 512–513, 362, 509
See application file for complete search history.

(56) References Cited

U.S. PATENT DOCUMENTS

| | | | | |
|---|---|---|---|---|
| 4,309,604 | A * | 1/1982 | Yoshikawa et al. | 250/226 |
| 4,679,162 | A * | 7/1987 | Chamran et al. | 702/198 |
| 4,763,525 | A * | 8/1988 | Cobb | 73/599 |
| 4,876,534 | A * | 10/1989 | Mead et al. | 340/14.67 |
| 4,906,836 | A * | 3/1990 | Yamashita et al. | 250/226 |
| 5,838,807 | A * | 11/1998 | Andersson et al. | 381/321 |
| 6,642,500 | B2 * | 11/2003 | Takahashi | 250/214 L |
| 7,146,860 | B2 * | 12/2006 | Yeh et al. | 73/708 |

* cited by examiner

*Primary Examiner* — Dinh T. Le
(74) *Attorney, Agent, or Firm* — Murphy, Bilak & Homiller, PLLC (57) ABSTRACT

The invention relates to an arrangement comprising a logarithmizing unit and a subtracting unit, wherein the subtracting unit has an output at which a voltage value linearly proportional to the temperature can be tapped off.

11 Claims, 6 Drawing Sheets

ARRANGEMENT, USE OF AN ARRANGEMENT, REFERENCE VOLTAGE SOURCE AND METHOD FOR GENERATING A VOLTAGE VALUE LINEARLY PROPORTIONAL TO THE TEMPERATURE

CROSS-REFERENCE TO RELATED APPLICATION

This application claims priority to German application number DE 10 2008 015 696.5 filed Mar. 26, 2008, the content of which is herein incorporated by reference in its entirety.

FIELD OF THE INVENTION

The invention relates to an arrangement, use of an arrangement, reference voltage source and method for generating a voltage value linearly proportional to temperature, and particularly to an arrangement, use of an arrangement, reference voltage source and method for generating a voltage value linearly proportional to the temperature with a logarithmizing unit and a subtracting unit, wherein a voltage value can be tapped off at the output of the subtracting unit and said voltage value is linearly proportional to the temperature.

BACKGROUND

Reference voltage sources which are very substantially independent of process fluctuations, fluctuations of the supply voltage and fluctuations of the ambient variables are required nowadays in integrated circuits. Examples of ambient variables that shall be mentioned here include temperature, pressure and the like. Furthermore, high-volume integrated circuits require temperature sensors which detect a value representing the ambient temperature in the circuit and, with the result of this detection, control corresponding compensation circuits or actively control the circuits.

For generating a reference value, for example a reference voltage, which is, in particular, temperature-independent or linearly proportional to the temperature, a multiplicity of circuits and circuit concepts have been disclosed heretofore. One known method for generating a reference value is the principle of compensating for fluctuations that are accumulated in the form of additive disturbance on a reference value. Temperature compensation is often carried out in this case. The reference values are determined in many cases by the prefactor k*T/e, where k is the Boltzmann constant, T is the temperature and e is the elementary charge.

Changes in conductivity of temperature-sensitive components have usually been used heretofore for determining the temperature. Temperature-sensitive components that shall be specified here include metal or semiconductor resistors, PN or tunnel junction of components or bipolar transistors. These conductivities of the components are not absolute quantities. They are subjected to the production tolerances and usually require calibration routines for an accurate temperature measurement. This usually involves a temperature sensor undergoing passes with known temperature cycles and the measured conductivity or the current value corresponding to the temperature being stored. These stored values are compared with the measured values later in order to reconstruct the actual temperature value. At low temperatures, the thermal noise is also used for measuring the temperature in special cases.

All previously known methods for generating a reference value require a correspondingly high supply voltage for suppressing process fluctuations and fluctuations of the supply voltage.

SUMMARY

An arrangement comprising at least two logarithmizing units is presented, wherein each logarithmizing unit has an input and an output, is connected by the input to a first terminal of a voltage source, wherein the voltage source provides an input voltage and has a second terminal, which is connected to reference-ground potential, has a semiconductor component and has an operating point setting unit, wherein the operating point setting unit sets an operating point in the sub threshold voltage range of the input characteristic curve of the semiconductor component, and a subtracting unit, wherein the subtracting unit has a first input, a second input and also an output, wherein a respective one of the inputs of the subtracting unit is connected to one of the outputs of the logarithmizing units, and wherein a voltage value can be tapped off at the output of the subtracting unit and the voltage value is linearly proportional to the temperature.

Furthermore, the use of the arrangement as a temperature sensor is provided, wherein the semiconductor component is a field effect transistor, an evaluation unit is connected downstream of the subtracting unit, the evaluation unit detects the voltage value that can be tapped off and determines the temperature by means of a calculation unit within the evaluation unit, wherein the voltage value that can be tapped off is dependent only on the depletion zone capacitances, the Boltzmann constant, the elementary charge and the natural logarithm of a resistance ratio within the logarithmizing unit.

Furthermore, a reference voltage source with use of the arrangement is provided, wherein the temperature dependence of the voltage value that can be tapped off is compensated for.

Moreover, a method for generating a voltage value linearly proportional to the temperature by means of a semiconductor component is presented, comprising the following method steps: setting a first operating point in the sub threshold voltage range of the input characteristic curve of the semiconductor component, logarithmizing a temperature-dependent input voltage, using the semiconductor component, differentiating the logarithmic input voltage, and tapping off or providing the voltage value linearly proportional to the temperature.

Furthermore, a method for generating a voltage value linearly proportional to the temperature by means of semiconductor components is provided, comprising the following method steps: setting a first operating point in the sub threshold voltage range of the input characteristic curve of a first semiconductor component, setting a second operating point in the sub threshold voltage range of the input characteristic curve of a second semiconductor component temporally in parallel with setting the first operating point, wherein the first operating point is not equal to the second operating point, logarithmizing a temperature-dependent input voltage, simultaneously using both semiconductor components, forming the difference between the two logarithmic input voltages, and tapping off or providing the voltage value linearly proportional to the temperature.

A method for generating a voltage value linearly proportional to the temperature by means of a semiconductor component is described, comprising the following method steps: setting a first operating point in the sub threshold voltage range of the input characteristic curve of the semiconductor component, logarithmizing a temperature-dependent input voltage, using the semiconductor component, buffer-storing the logarithmized input voltage, setting a second operating point in the sub threshold voltage range of the input characteristic curve of the semiconductor component, logarithmizing a temperature-dependent input voltage, using the semiconductor component with a changed operating point, buffer-storing the second logarithmized input voltage, forming the difference between the two logarithmized input voltages, tapping off or providing the voltage value linearly proportional to the temperature.

Further configurations are described in the independent patent claims.

The invention is explained below on the basis of exemplary embodiments with reference to the drawings. In this case, identical or identically acting constituent parts in the figures are in each case identified by the same reference symbols. The elements illustrated should not be regarded as true to scale; rather, individual elements may be illustrated with an exaggerated size or with exaggerated simplification, in order to afford a better understanding.

BRIEF DESCRIPTION OF THE DRAWINGS

FIG. 8 shows in a and b an alternative semiconductor component in different interconnection variants.

FIG. 10b shows an alternative arrangement with respect to the arrangement illustrated in FIG. 10a.

DETAILED DESCRIPTION

Figure 1:
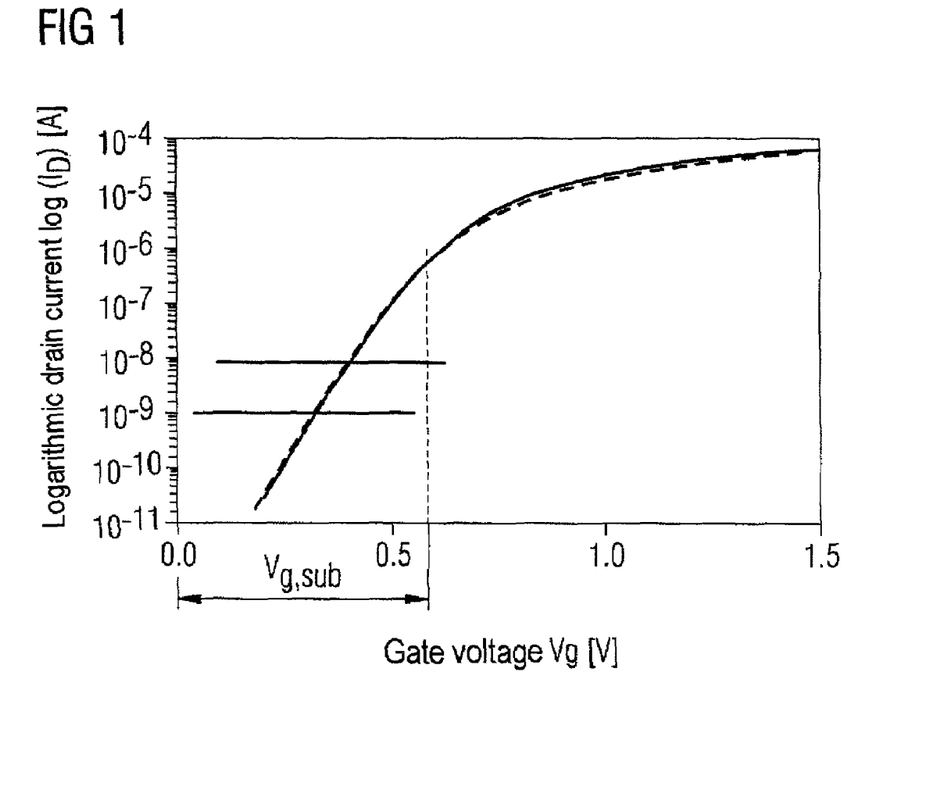
FIG. 1 shows an input characteristic curve of a semiconductor component with a logarithmic representation of the drain current $I_D$ versus the gate voltage $V_g$.

An input characteristic curve of a semiconductor component 3 is indicated in FIG. 1. In this case, the drain current $I_D$ through said semiconductor component 3 is represented logarithmically versus the gate voltage $V_g$. The sub threshold voltage range $V_{g,sub}$ illustrated here extends from 0 volts to approximately 0.6 volt. The characteristic curve of the semiconductor component 3 can be regarded as virtually exponential in this range. By virtue of the logarithmic representation, the input characteristic curve of the semiconductor component 3 is a straight line in the range $V_{g,sub}$. In this example, an NMOS field effect transistor as semiconductor component 3 was operated with a drain voltage of one volt. The NMOS field effect transistor has a gate width of 0.3 μm and a gate length of 0.25 μm. Almost all semiconductor components 3 have an exponential input characteristic curve in the sub threshold voltage range $V_{g,sub}$. Irrespective of the type of semiconductor component 3, the characteristic curve in the sub threshold voltage range $V_{g,sub}$ can be described by the following formula:

$$dV_g/d\ln(I_D) = (k*T/e)*\ln(10)*(1+C_d/C_i).$$

If the semiconductor component 3 is a bipolar transistor, then the last term $(1+C_d/C_i)$ is omitted.

The term $dV_g/d\ln(I_D)$ is referred to as the inverse sub threshold slope. On the basis of this equation, the inverse sub threshold slope is dependent on the Boltzmann constant k, the elementary charge e and the temperature T. Specifically in the case of a MOS transistor, an additional dependence on the depletion capacitance $C_d$ and the dielectric capacitance $C_i$ is also present.

The following illustrations present arrangements and methods which utilize this exponential inverse sub threshold slope and provide a voltage value linearly proportional to the temperature. For this purpose, an input voltage $V_e$ is firstly logarithmized. This is followed by differentiation with respect to the gate voltage $V_g$. After the differentiation, a voltage value $V_{out}$ linearly proportional to the temperature T can be tapped off. In one exemplary embodiment, instead of the differentiation, difference formation is carried out, which leads to the same result on account of the logarithmized exponential relationship between drain current $I_D$ and gate voltage $V_g$.

Figure 2:
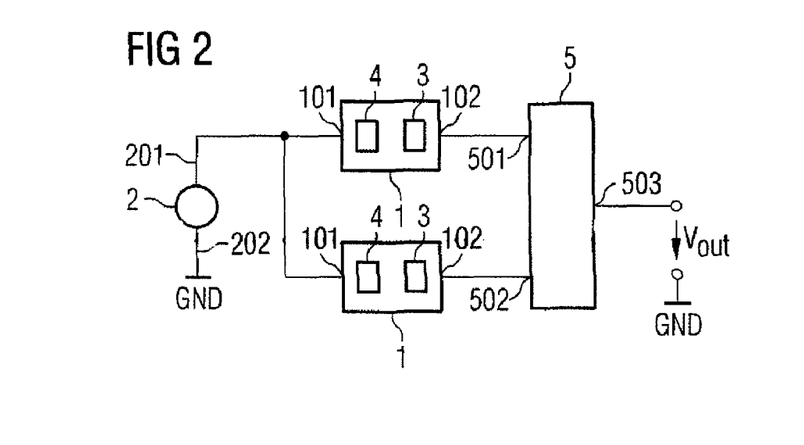
FIG. 2 shows an exemplary embodiment of an arrangement for providing a voltage value that is linearly proportional to the temperature.

FIG. 2 presents an exemplary embodiment of an arrangement for generating a voltage value linearly proportional to the temperature. Two logarithmizing units 1 are provided for this purpose. The logarithmizing units 1 each have an input 101 and an output 102. The two inputs 101 of the logarithmizing units 1 are connected to a first terminal 201 of a voltage source 2. The voltage source 2 has a second terminal 202, which is connected to a reference-ground potential GND. The voltage source 2 provides an input voltage $V_e$. Each of the logarithmizing units 1 contains an operating point setting unit 4 and a semiconductor component 3. The two outputs 102 of the logarithmizing units 1 are respectively connected to an input 501, 502 of a subtracting unit 5. The subtracting unit 5 additionally has an output 503, at which a voltage value $V_{out}$ linearly proportional to a temperature T can be tapped off.

The operating point setting unit 4 sets an operating point on the input characteristic curve of the semiconductor component 3 according to FIG. 1, wherein the operating point lies in the sub threshold voltage range $V_{g,sub}$ of the semiconductor component 3. A logarithmized sub threshold voltage value is available at the output 102 of the logarithmizing unit 1. The two semiconductor components 3 are, in particular, of identical design. Transistors having an identical gate width and gate length are preferably used when a MOSFET transistor is used. Each operating point setting unit 4 sets a different operating point on the characteristic curve illustrated in FIG. 1. As a result, different voltages can be tapped off at the two outputs 102 of the logarithmizing units 1, which voltages are taken away, or subtracted, from one another in the subtracting unit 5. The setting of different operating points in the characteristic curve and the subsequent subtraction of the two voltages is the circuitry realization of difference formation for obtaining the voltage value. The voltage $V_{out}$ is linearly proportional to the temperature T. As an alternative, differentiation with respect to the gate voltage $V_g$ of the voltage value available at the output of the logarithmizing unit 1 is also possible.

Figure 3:
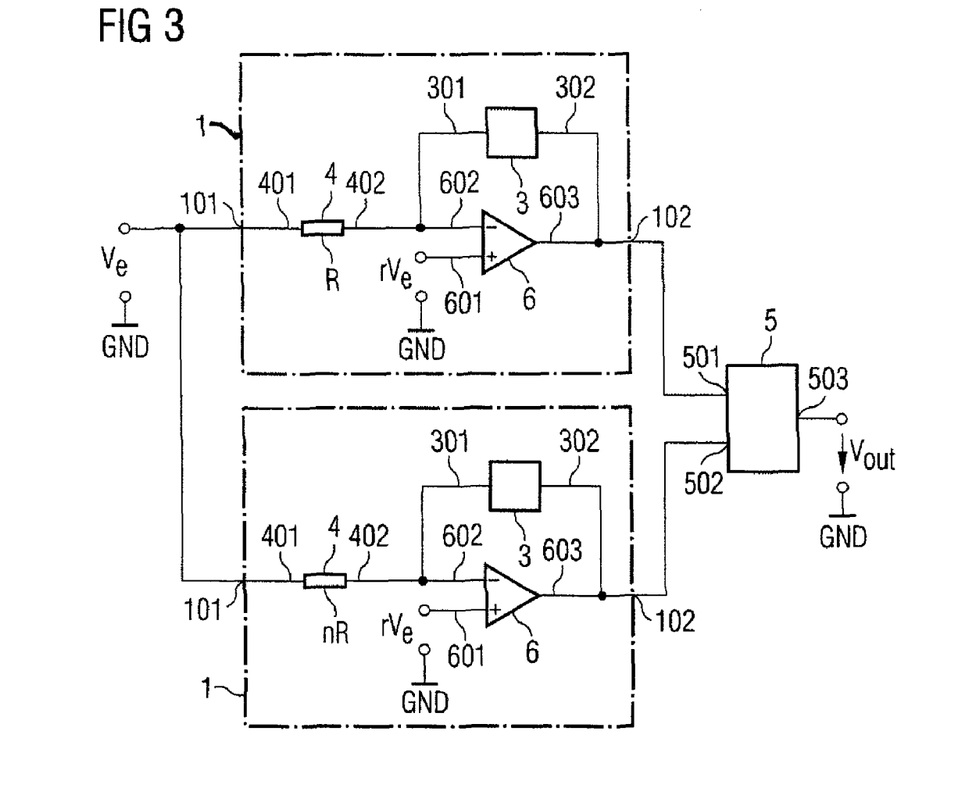
FIG. 3 shows a development of the exemplary embodiment illustrated in FIG. 2.

FIG. 3 presents a development of the exemplary embodiment illustrated in FIG. 2. Only the differences between FIG. 2 and FIG. 3 are discussed below. FIG. 3 essentially illustrates the logarithmizing unit 1 in greater detail. The operating point setting unit 4 and the semiconductor component 3 are shown in the logarithmizing unit 1. The operating point setting unit 4 has an input 401, which is connected to the input of the logarithmizing unit 101. The output 402 of the operating point setting unit 4 is connected to a first terminal 301 of the semiconductor component 3. The second terminal 302 of the semiconductor component 3 is in turn connected to the output 102 of the logarithmizing unit 1. An operational amplifier 6 is disposed in parallel with the semiconductor component 3. The operational amplifier 6 is connected by its negative input 602 to the first terminal 301 of the semiconductor component. The output 603 of the operational amplifier 6 is connected to the second terminal 302 of the semiconductor component 3. The operational amplifier 6 has a positive input 601. The positive input 601 of the operational amplifier 6 is connected to an integer multiple r of the input voltage $V_e$ of the voltage source 2.

The operating point setting unit 4 in this case is a non-reactive resistor having the value R. The second logarithmizing unit 1, which is connected to the second input 502 of the subtracting unit 5, is constructed identically to the logarithmizing unit just described, with the only exception being that the operating point setting unit 4 has a resistance value amounting to n times the resistance value R. Consequently, each of the two operating point setting units 4 sets a different operating point in the sub threshold voltage range $V_{g,sub}$ of the semiconductor component 3.

High common-mode rejection and supply voltage suppression are produced owing to the use of an operational amplifier 6 in the logarithmizing unit 1. The operational amplifier is connected up as a logarithmizer by the semiconductor component 3 being arranged in its feedback path. The output 603 of the operational amplifier 6 has to drive a current $I_s=V_e*(r-1)*R$ through the operating point setting unit 4 in order to stabilize the negative input 602 of the operational amplifier 6 to the same voltage as the positive input 601. This stabilization is the fundamental task of the operational amplifier 6. Since said current $I_s$ likewise flows through the semiconductor component 3, a voltage:

$$V=(k*T/e)*ln(V_e)*(r-1)/I_s*R$$

is present at the output 603 of the operational amplifier 6. A term $(1+C_d/C_i)$ is additionally inserted in the case where MOSFET transistors are used. In this case, $I_s$ describes a current that flows through the respective semiconductor component. $V_e$ is the input voltage $V_e$ of the voltage source 2.

By virtue of the fact that the second logarithmizing unit 1, which is connected to the second input 502 of the subtracting unit 5, sets a different operating point in the semiconductor component 3 and a difference between the two logarithmizing unit output voltage values can be tapped off at the output 503 of the subtracting unit 5, a voltage:

$$\Delta V=k*T/e*ln(n)$$

results at the output 503 of the subtracting unit 5.

This means that the resulting voltage $\Delta V$ at the output 503 is dependent only on the temperature T and the natural constants k and e. In this case, n represents the ratio of the two resistances R, nR. The ratio should preferably be chosen such that the difference in the voltage drop is large in relation to process fluctuations but also small enough that a constant sub threshold voltage slope can be assumed. n typically lies between 4 and 16.

If MOSFET transistors are used, a product term $(1+C_d/C_i)$ should be inserted. In this case, the capacitance of the depletion zone corresponds to the values $C_d$, and the dielectric capacitance corresponds to the value $C_i$.

Figure 4:
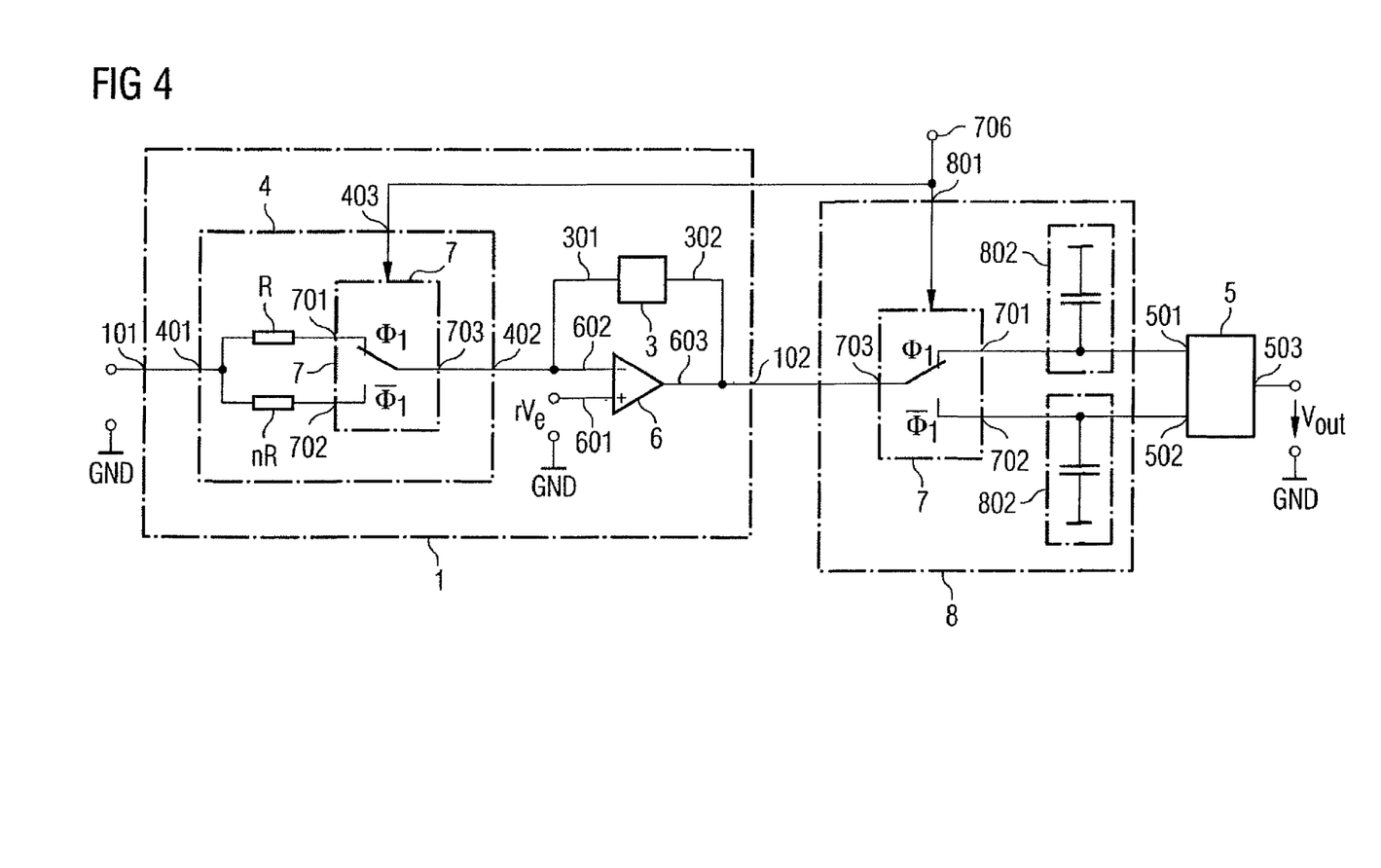
FIG. 4 shows an alternative exemplary embodiment with regard to the exemplary embodiment illustrated in FIG. 1.

An alternative exemplary embodiment to FIG. 2 is presented in FIG. 4. In contrast to FIG. 1, only one logarithmizing unit 1 is provided in FIG. 4. The logarithmizing unit 1 has an input 101 and an output 102. The input 101 is in turn connected to the first potential 201 of the voltage source 2. A changeover unit 8 is provided between logarithmizing unit 1 and subtracting unit 5. The changeover unit 8 has two outputs, wherein each output is connected to in each case only one input 501 or 502 of the subtracting unit 5. A voltage $V_{out}$ linearly proportional to the temperature can again be tapped off at the output 503 of the subtracting unit 5. An operational amplifier 6, a semiconductor component 3 and an operating point setting unit 4 are once again shown in the logarithmizing unit 1. In contrast to FIG. 1, the operating point setting unit 4 is embodied alternatively in FIG. 4. The operating point setting unit 4 has an input 401 and an output 402. Two resistors R and nR are provided in the operating point setting unit 4. A switching element 7 is additionally inserted into the operating point setting unit 4. Said switching element 7 has a first input 701, which is connected to one terminal of the resistor R. A second input 702 of the switching element 7 is connected to the resistor nR. An output 703 of the switching element 7 is connected to the output 402 of the operating point setting unit 4. The operating point setting unit 4 additionally has a control input 403. The resistors R and nR are connected to one another by the respective other terminal and are connected to the input 401 of the operating point setting unit 4.

The changeover unit 8 likewise has a switching element 7. This switching element 7 is identical to the switching element 7 of the operating point setting unit 4. The switching element 7 in the changeover unit 8 is connected to the output 102 of the logarithmizing unit 1. The first input 701 of the switching element is connected to a storage element 802. The storage element 802 is in turn connected to the first input 501 of the subtracting unit 5. The second input 702 is likewise connected to a further storage element 802. The further storage element 802 is in turn connected to the second input 502 of the subtracting unit 5. Both switching elements 7 have two switching states 704, 705. By means of a switching signal 706, both switching elements 7 are switched from the first switching state 704 to the second switching state 705, and vice versa.

Figure 5:
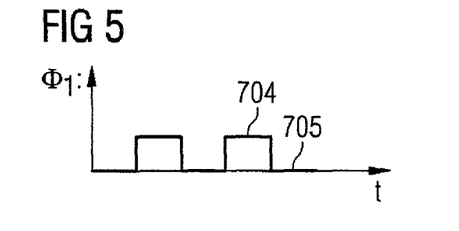
FIG. 5 shows a voltage-time diagram of a switching signal.

A corresponding switching signal $\phi_1$ is illustrated in FIG. 5. A first switching state 704 of the switching signal 706 is, for example, a high state of a digital signal and the second switching state 705 is the low state of the switching signal 706.

In contrast to FIG. 2, only one logarithmizing unit is necessary in FIG. 4. By means of the operating point setting unit 4, firstly a first operating point of the semiconductor element 3 is set by the first switching state 704 of the switching element 7. Since both switching elements 7 in each case always have the same switching state, the output of the logarithmizing unit 102 is firstly combined with the first input 501 via the storage element 802. The storage element 802 is a capacitor, for example, which is connected to reference-ground potential GND. If the corresponding first voltage value of the output 102 of the logarithmizing unit 1 is stored in the storage element 802, each switching element 7 is switched from the first switching state 704 to the second switching state 705 by means of the switching signal 706. In the second switching state 705, the resistor nR in the operating point setting unit 4 is connected to the negative input 602 of the logarithmizing operational amplifier 6. As a result, a second operating point, which is different than the first operating point, is set in the semiconductor component 3. The output voltage value at the output 102 of the logarithmizing unit 1 is stored in the further storage element 802. The subtracting unit subtracts the two stored values of the storage elements 802 and provides the voltage $V_{out}$ at the output 503. By means of the switching signal 706, the switching elements 7 change their state, whereby different operating points are set in the sub threshold voltage range of the semiconductor component 3.

The exemplary embodiment according to FIG. 4 requires less space.

Figure 6:
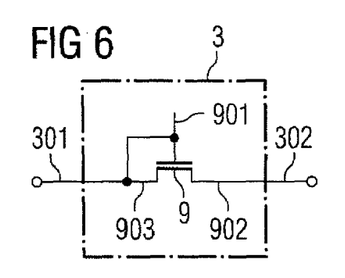
FIG. 6 shows a semiconductor component.

FIGS. 6, 7, 8a and 8b each present alternative exemplary embodiments of semiconductor components 3. FIG. 6 illustrates an NMOSFET transistor 9. The latter is connected up as a diode, that is to say that the gate terminal 901 of the transistor 9 is connected to the source terminal 903. The drain terminal 902 corresponds to the second terminal 302 of the semiconductor component 3, whereas the source terminal 903 corresponds to the first terminal 301 of the semiconductor component 3. If an NMOSFET transistor is used as the semiconductor component, the voltage $V_{out}$ that can be tapped off is additionally dependent on the capacitance of the depletion zone $C_d$ and the dielectric capacitance $C_i$. The circuit can likewise be realized with a PMOSFET transistor. The capacitance of the depletion zone $C_d$ is process-independent in all cases. Long-channel transistors or transistors having a long-channel behavior should ideally be used. A semiconductor component 3 is referred to as long-channel if its gate length is higher by a multiple, for example ten, then the minimum gate length that can be used in the technology. By way of example, the corresponding gate length of the transistor 9 should be ten times greater than the minimum gate length available in the respective technology.

Figure 7:
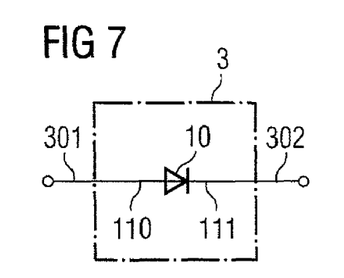
FIG. 7 shows an alternative semiconductor component.

FIG. 7 illustrates an alternative semiconductor component. A diode 10 as semiconductor component 3 in this case has an anode terminal 110 corresponding to the first terminal 301 of the semiconductor component 3. The cathode terminal 111 is the second terminal 302 of the semiconductor component 3.

Figure 8A:
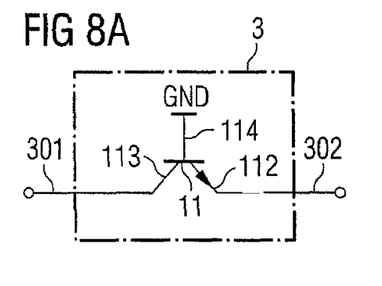

An alternative semiconductor component 3 is presented in FIG. 8a. A bipolar transistor 11 is used in this case, the base terminal 114 of said bipolar transistor being connected to reference-ground potential GND. The emitter terminal 112 corresponds to the second terminal 302 of the semiconductor component 3. The collector terminal 113 of the bipolar transistor 11 is identical with the first terminal 301 of the semiconductor component 3. When a bipolar transistor 11 is used, the depletion zone capacitance $C_d$ and the dielectric capacitance $C_i$ are not included as parameters of the voltage value $V_{out}$ that can be tapped off.

Figure 8B:
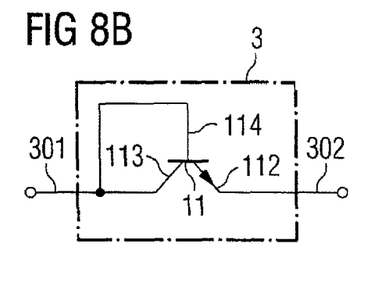

The same semiconductor component 3 as in FIG. 8a is used in FIG. 8b. In contrast to FIG. 8a, the base terminal 114 is not connected to reference-ground potential GND, but rather to the collector terminal 113.

Figure 9:
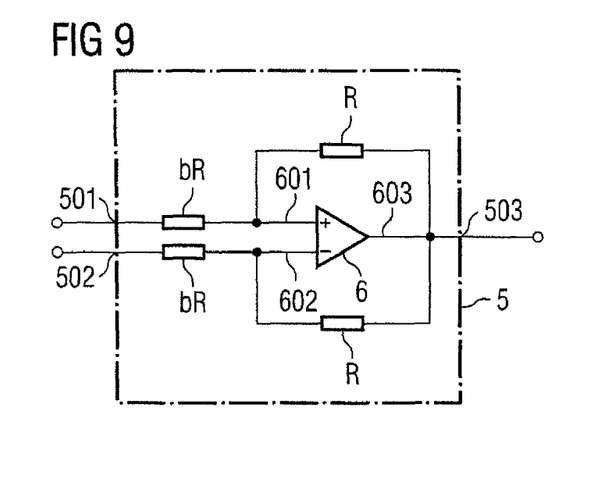
FIG. 9 shows a subtracting unit.

FIG. 9 illustrates a subtracting unit 5 in greater detail. The operational amplifier variant should preferably be used. A description at this juncture can be omitted since the circuit is known from the prior art.

The figures that have been represented up to this point present an arrangement corresponding to a linear temperature sensor that is dependent only on physical constants k, e and a constant divider ratio n. In special cases, the capacitance of the depletion zone $C_d$ and the dielectric capacitance $C_i$ are also present as parameters. If the voltage $V_{out}$ is tapped off and acquired, the temperature can be deduced in a simple manner. This is done primarily in an evaluation unit connected downstream of the subtracting unit. The evaluation unit preferably has a calculation unit, which implements the known formula and supplies a current temperature value T. The evaluation unit can be embodied in terms of hardware or else software technology. Consequently, this circuit is suitable as an absolute and linear temperature sensor which thus covers a relatively large temperature range. The construction with operational amplifiers 6 additionally makes it possible to obtain a high degree of suppression of disturbing influences as a result of supply voltage fluctuations.

If the intention is, then, to produce a reference voltage source, the temperature dependence of the arrangement should ideally be eliminated. In this case, branched-off temperature-compensated voltages are generated in FIGS. 10a and 10b. These circuits are taken from the prior art. They provide a further reference $V_{T,ref}$ having a negative temperature coefficient. The description of FIGS. 10a and 10b is dispensed with at this juncture.

Figure 10A:
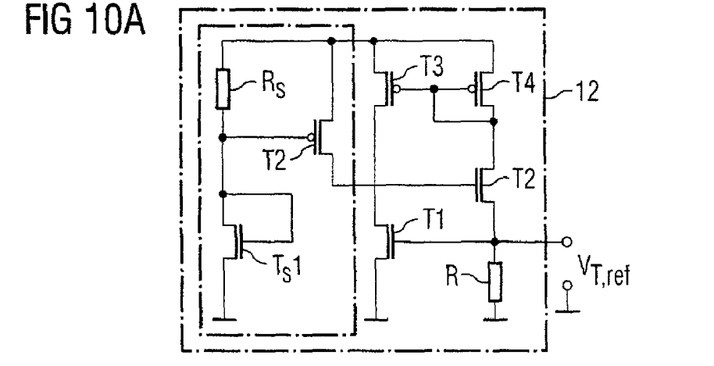
FIG. 10a shows an arrangement for generating a voltage reference.
Figure 10B:
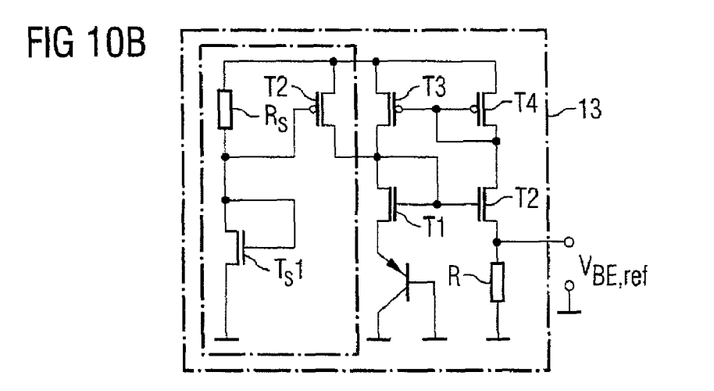

The arrangements from FIGS. 10a and 10b are insensitive to fluctuation of the supply voltage. $V_{T,ref}$ as output voltage of the arrangement from FIG. 10a corresponds approximately to the threshold voltage value $V_{th,T1}$ of the transistor T1 as a function of the temperature. The following holds true:

$$V_{T,ref} \approx V_{th,T1}(T1) \approx V_{th,T1}(T_0)*(T_0/T-1).$$

In this case, $V_{th,T1}$ is the threshold voltage of the transistor T1 and $T_0$ is room temperature, that is to say approximately 300 Kelvin.

The variant according to FIG. 10b, by contrast, supplies process parameters resulting in significantly more independent voltage references $V_{T,ref}$.

Figure 11:
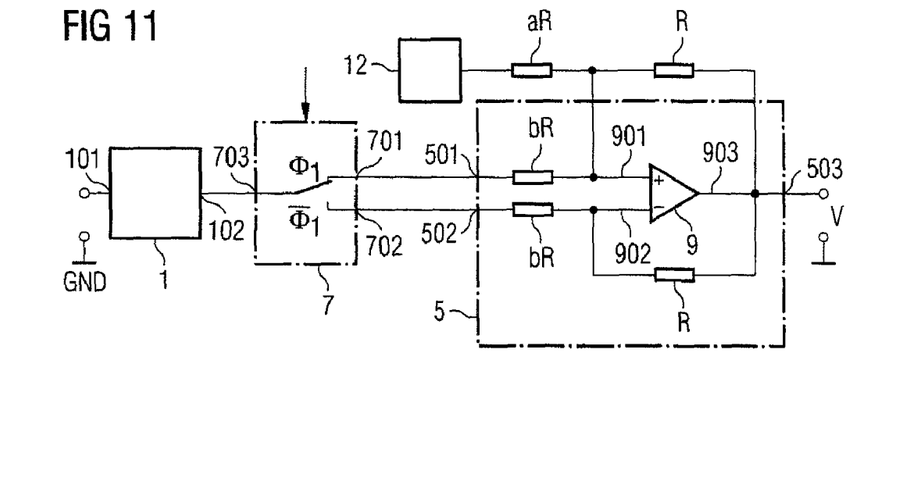
FIG. 11 shows an exemplary embodiment for generating a temperature-independent voltage value.

FIG. 11 then indicates an exemplary embodiment of an arrangement which supplies a temperature-independent voltage reference VT,out as output voltage. The subtracting unit 5 is embodied in the manner illustrated in FIG. 9. In addition, a further branching is provided at the positive input 901 of the operational amplifier 9 of the subtracting unit 5, a series circuit composed of an a-fold non-reactive resistance and the unit 12 illustrated in FIG. 10a being connected to said further branching. The temperature compensation is achieved by means of the resistance aR.

A temperature-compensated voltage source can likewise be produced for the circuit from FIG. 10a by a Taylor series expansion of the equation for $V_{T,ref}$. In this case, the divider ratios a and b of the resistance values aR, bR should be chosen such that the temperature dependence $\Delta_{Vref}$ is precisely compensated for. A temperature-independent voltage reference according to FIG. 10b can also be produced analogously in this way.

A simple temperature sensor accurate to a few degrees can likewise be used for generating $V_{T,ref}$. The corresponding accuracy is obtained by the arrangement according to FIG. 11.

Offset compensation methods are also conceivable in addition to the fundamental representations of the operational amplifier circuit. Errors in the transfer functions are thereby minimized by offset voltages. Auto-calibrating methods should primarily be used for this purpose. Such methods are referred to as correlating double sampling CDS or chopper stabilization. In the CDS method, an assessment is not performed in absolute terms, but rather relative to a reference value.

Should the temperature response of the reference circuit not follow linear laws, then the voltage of the voltage references and thus also the temperatures thereof can be inverted by a suitable circuit or provided with quadratic terms. The temperature accuracy of the voltage reference can thus be increased.

Figure 12:
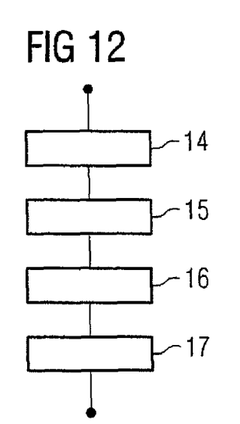
FIG. 12 shows a method flowchart for a method for generating a voltage value linearly proportional to the temperature.

FIG. 12 illustrates a method flowchart for a method for generating a voltage value linearly proportional to the temperature. The method comprises a first step 14, which involves setting a first operating point in the sub threshold voltage range of a semiconductor component 3. A further step 15 involves logarithmizing the input voltage $V_e$ with the aid of this set semiconductor component 3. The subsequent step 16 involves differentiating the logarithmized voltage value at the operating point with respect to the gate voltage $V_g$. Finally, method step 17 involves providing a voltage linearly proportional to the temperature T.

Figure 13:
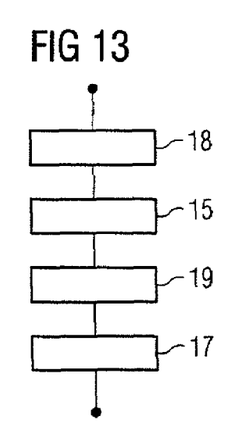
FIG. 13 shows a method flowchart for an alternative method for generating a voltage value linearly proportional to the temperature.

A method flowchart for an alternative method from FIG. 12 is presented in FIG. 13. In this case, step 18 involves setting a first operating point in the sub threshold voltage range of the input characteristic curve of the semiconductor component, temporally in parallel with a second operating point in the sub threshold voltage range of the input characteristic curve of a further semiconductor component 3. This is followed by method step 15, in which the input voltage $V_e$ is logarithmized simultaneously with the aid of the semiconductor components 3 in the logarithmizing unit 1. Accordingly, two different logarithmized input voltage values are available. Afterward, method step 19 involves forming the difference between the two logarithmized input voltage values. The subsequent method step 17 involves providing a voltage value linearly proportional to the temperature.

Figure 14:
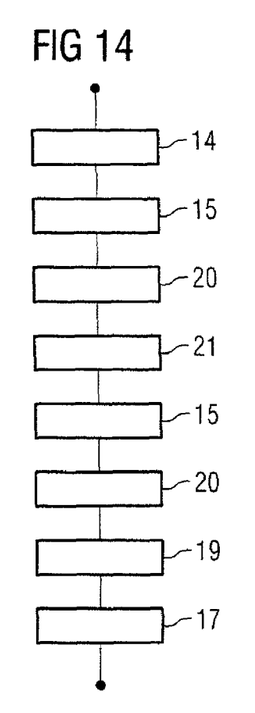
FIG. 14 shows a method flowchart for an alternative method for generating a voltage value linearly proportional to the temperature.

A method flowchart for a further alternative method from FIG. 12 is presented in FIG. 14. In this case, firstly step 14 involves setting a first operating point in the sub threshold voltage range of the input characteristic curve of the semiconductor component 3, subsequent step 15 involves logarithmizing the input voltage value $V_e$ with the aid of the set semiconductor component 3, and subsequent step 20 involves buffer-storing the logarithmized voltage value. Subsequent method step 21 involves setting a second operating point in the sub threshold voltage range of the input characteristic curve of the semiconductor component. This is followed by logarithmizing the input voltage value $V_e$ with the aid of the newly set semiconductor component 3 in method step 15. Step 20 involves buffer-storing the second logarithmized input voltage value. Step 19 then involves forming the difference between the two logarithmic voltage values. Finally, method step 17 in turn provides for providing a voltage value linearly proportional to the temperature.

LIST OF REFERENCE SYMBOLS

1 Logarithmizing unit
   101 Input of the logarithmizing unit
   102 Output of the logarithmizing unit
2 Voltage source
   201 First potential of the voltage source
   202 Second potential of the voltage source
3 Semiconductor component
   301 First terminal of the semiconductor component 1
   302 Second terminal of the semiconductor component 1
4 Operating point setting unit
   401 Input of the operating point setting unit
   402 Output of the operating point setting unit
   403 Control input of the operating point setting unit
5 Subtracting unit
   501 First input of the subtracting unit
   502 Second input of the subtracting unit
   503 Output of the subtracting unit
6 Operational amplifier
   601 Positive input of the op-amp
   602 Negative input of the op-amp
   603 Output of the op-amp
7 Switching element
   701 First terminal of the switching element
   702 Second terminal of the switching element
   703 Third terminal of the switching element
   704 First switching state
   705 Second switching state
   706 Switching signal
8 Changeover unit
   801 Control input of the changeover unit
   802 Storage element
9 Field effect transistor
   901 Gate terminal
   902 Drain terminal
   903 Source terminal
10 Diode
   110 Anode
   111 Cathode
11 Bipolar transistor
   112 Emitter terminal
   113 Collector terminal
   114 Base terminal
12 MOSFET-based auxiliary reference voltage
13 Bipolar-transistor-based auxiliary reference voltage
14 Setting a first operating point
15 Logarithmizing
16 Differentiating
17 Providing
18 Temporally parallel setting of a first and second operating point
19 Difference formation
20 Buffer-storage
21 Setting a second operating point
$C_d$ Depletion capacitance
$C_i$ Dielectric capacitance
e Elementary charge (e=1.602 176 487·10$^{-19}$ C)
GND Reference-ground potential, ground
$I_D$ Drain current
k Boltzmann constant (k=1.3806504·10$^{-23}$ J/K)
n Ratio of the resistance values
R Nonreactive resistor having value R
   nR nonreactive resistor having n times value R
   aR nonreactive resistor having a times value R
   bR nonreactive resistor having b times value R
T Temperature [K]
$T_0$ Room temperature ($T_0$=300K)
T1, T2, T3, T4 Transistors of the auxiliary reference voltage
$V_e$ Input voltage
$r_{Ve}$ r times the input voltage Ve
$V_g$ Gate voltage
$V_{g,sub}$ Sub threshold voltage
$V_{ref}$ Reference voltage
$V_{T,ref}$ Auxiliary reference voltage
$V_{th,T1}$ Threshold voltage of the transistor T1
$V_{out}$ Voltage value that can be tapped off
$\phi_1$ Switching signal
$\overline{\Phi}_1$ Inverted switching signal

What is claimed is:
1. An arrangement comprising:
at least two logarithmizing units, wherein each logarithmizing unit:
has an input and an output, is connected by the input to a first terminal of a voltage source, wherein the voltage source provides an input voltage and has a second terminal which is connected to reference-ground potential, has a transistor device semiconductor component which comprises a field effect transistor and has an operating point setting unit configured to set an operating point in a sub threshold voltage range of a drain current-to-gate voltage input characteristic curve of the semiconductor component so that a logarithmized sub threshold voltage value is available at the output of each logarithmizing unit, a subtracting unit having a first input, a second input and an output, wherein a respective one of the inputs of the subtracting unit is connected to one of the outputs of the logarithmizing units, and wherein the subtracting unit is configured to subtract the logarithmized sub threshold voltage values output by the at least two logarithmizing units to generate a voltage value tapped off at the output of the subtracting unit which is linearly proportional to absolute temperature, and an evaluation unit connected downstream of the subtracting unit, the evaluation unit configured to detect the voltage value tapped off at the output of the subtracting unit and determine the absolute temperature of each field effect transistor by means of a calculation unit within the evaluation unit, wherein the voltage value tapped off at the output of the subtracting unit is dependent on depletion zone capacitances of the field effect transistors, the Boltzmann constant, the elementary charge and the natural logarithm of a resistance ratio within the logarithmizing unit.

2. The arrangement as claimed in claim 1, wherein for each logarithmizing unit:

the semiconductor component has two terminals,
the operating point setting unit has an input and an output,
the input of the operating point setting unit is connected to the input of the logarithmizing unit,
the output of the operating point setting unit is connected to the first terminal of the semiconductor component, and
the second terminal of the semiconductor component is connected to the output of the logarithmizing unit.

3. The arrangement as claimed in claim 1, wherein the operating point setting units are resistors and the different operating points can be set by different resistance values of the resistors.

4. The arrangement as claimed in claim 3, wherein the ratio of the different resistance values is between 4 and 16.

5. A reference voltage source for use with an arrangement as claimed in claim 1, wherein a temperature dependence of the voltage value tapped off at the output of the subtracting unit is compensated for by the reference voltage source.

6. The reference voltage source as claimed in claim 1, wherein a temperature dependence of the voltage value tapped off at the output of the subtracting unit is compensated for by means of a temperature sensor or by means of a component having a negative temperature coefficient.

7. An arrangement comprising:

at least two logarithmizing units, wherein each logarithmizing unit:
has an input and an output,
is connected by the input to a first terminal of a voltage source, wherein the voltage source provides an input voltage and has a second terminal connected to a reference-ground potential,
has a bipolar transistor, and
has an operating point setting unit configured to set an operating point in a sub threshold voltage range of an input characteristic curve of the bipolar transistor so that a logarithmized sub threshold voltage value is available at the output of each logarithmizing unit, a subtracting unit having a first input, a second input and an output, wherein a respective one of the inputs of the subtracting unit is connected to one of the outputs of the logarithmizing units, and wherein the subtracting unit is configured to subtract the logarithmized sub threshold voltage values output by the at least two logarithmizing units to generate a voltage value tapped off at the output of the subtracting unit which is linearly proportional to absolute temperature, and an evaluation unit connected downstream of the subtracting unit, the evaluation unit configured to detect the voltage value tapped off at the output of the subtracting unit and determine the absolute temperature of each bipolar transistor by means of a calculation unit within the evaluation unit, wherein the voltage value tapped off at the output of the subtracting unit is dependent on the Boltzmann constant, the elementary charge and the natural logarithm of a resistance ratio within the logarithmizing unit.

8. A method of generating a voltage value linearly proportional to temperature, comprising:

setting an operating point in a sub threshold voltage range of a drain current-to-gate voltage input characteristic curve of at least two field effect transistors of at least two logarithmizing circuits to produce a logarithmized sub threshold voltage value for each field effect transistor;

subtracting the logarithmized sub threshold voltage values using a substracting unit to generate a voltage value which is linearly proportional to absolute temperature and dependent on depletion zone capacitances of the field effect transistors, the Boltzmann constant, the elementary charge and the natural logarithm of a resistance ratio;

detecting the voltage value; and
determining the absolute temperature of each field effect transistor based on the detected voltage value.

9. A method according to claim 8, further comprising temperature compensating the voltage value.

10. A method for generating a voltage value linearly proportional to temperature, comprising:

setting an operating point in a sub threshold voltage range of an input characteristic curve of at least two bipolar transistors to produce a logarithmized sub threshold voltage value for each bipolar transistor;

subtracting the logarithmized sub threshold voltage values to generate a voltage value which is linearly proportional to absolute temperature and dependent on the Boltzmann constant, the elementary charge and the natural logarithm of a resistance ratio;

detecting the voltage value; and
determining the absolute temperature of each bipolar transistor based on the detected voltage value.

11. A method according to claim 10, further comprising temperature compensating the voltage value.

* * * * *